(12) United States Patent  (10) Patent No.: US 7,086,657 B2
Michelau et al.  (45) Date of Patent: Aug. 8, 2006

(54) ADJUSTABLE SEAT FOR CHILDREN'S VEHICLE

(75) Inventors: Frederick Michelau, Des Plaines, IL (US); Thomas Schlegel, Wheaton, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 11/147,865

(22) Filed: Jun. 7, 2005

(65) Prior Publication Data

US 2006/0001234 A1  Jan. 5, 2006

Related U.S. Application Data

(60) Provisional application No. 60/577,647, filed on Jun. 7, 2004.

(51) Int. Cl.
*B62J 1/00* (2006.01)
(52) U.S. Cl. ............ 280/282; 297/215.14; 297/344.11
(58) Field of Classification Search ................ 280/282, 280/287, 278; 297/215.14, 344.11, 337
See application file for complete search history.

(56) References Cited

U.S. PATENT DOCUMENTS

| | | | |
|---|---|---|---|
| 4,168,846 A * | 9/1979 | Carren | 280/278 |
| 4,546,991 A * | 10/1985 | Allen et al. | 280/282 |
| 5,356,356 A * | 10/1994 | Hildebrandt et al. | 482/62 |
| 6,634,711 B1 * | 10/2003 | Phillips et al. | 297/337 |
| 6,685,206 B1 * | 2/2004 | Blake | 280/278 |
| 6,752,453 B1 * | 6/2004 | Yapp | 297/215.14 |
| 2005/0247506 A1 * | 11/2005 | Rondeau et al. | 180/312 |

* cited by examiner

*Primary Examiner*—Kevin Hurley
(74) *Attorney, Agent, or Firm*—DLA Piper Rudnick Gray Cary US LLP

(57) ABSTRACT

A children's vehicle features a main frame member with a seat support member attached thereto. A generally horizontal plate is attached to the seat support member and features a central portion with a number of transverse ridges. Slots are formed in the plate on opposing sides of the central portion. The seat features a number of ridges formed on its bottom surface as well as a pair of bolt holes. Bolts pass through the seat bolt holes and the slots of the plate. Knobs engage the bottoms of the bolts and may be loosened to permit the seat to be moved relative to the plate and tightened so that the ridges of the seat engage the ridges of the plate to lock the seat in a selected position.

20 Claims, 6 Drawing Sheets

ADJUSTABLE SEAT FOR CHILDREN'S VEHICLE

BACKGROUND OF THE INVENTION

This application claims priority from U.S. Provisional Patent Application Ser. No. 60/577,647, filed Jun. 7, 2005.

BACKGROUND OF THE INVENTION

The present invention relates generally to children's vehicles and, more specifically, to an adjustable seat for a children's vehicle.

Tricycles are a well known and popular type of children's vehicle. A child's tricycle typically includes a frame having a head tube which pivotally supports a front fork assembly, a rear deck which is attached to a pair of rear wheels, and a main tube extending between the head tube and rear deck. The front fork assembly includes a fork member having a pair of opposing legs that rotatably support a front wheel, and a shaft extending upwardly from the fork legs through the head tube. The front wheel features a pedal crank which extends from opposing sides of the wheel. A pair of pedals are mounted one each on opposite ends of the pedal crank. The fork assembly also includes handlebars having a stem extending downwardly into the head tube and connecting with the shaft of the front fork assembly.

The main tube of such a tricycle typically is a length of tubing bent to form a front portion and a rear portion oriented at an obtuse angle with the front portion. The portion of the main tube approximately midway between the front and rear portions includes a vertically-extending hole which receives a seat post of a tricycle seat. The seat post is secured to the main tube by a set screw which is threaded through a transverse hole to contact the side of the seat post within the main tube.

While the above seat adjustment arrangement functions adequately, a wrench is required to adjust the seat. In addition, the arrangement results in the bottom portion of the seat post extending downwards from the bottom surface of the main tube which is unsightly.

An alternative seat adjustment arrangement features a plate welded or otherwise attached to the middle portion of the main tube so that it is oriented in a generally horizontal plane above the main tube. The plate features a number of holes arranged in transversely-aligned pairs running from the front to the back of the plate. Each pair of holes is sized and spaced so as to be capable of receiving a pair of bolts that pass downward through the seat. As a result, the position of the seat may be adjusted by selecting a pair of holes on the plate that correspond to the desired seat position. Once the seat is positioned in the desired position, and the bolts are passed down through the seat and selected pair of plate holes, nuts are attached to the downward extending bolts to secure the seat in the selected position. A disadvantage of this arrangement, however, is that tools must be used to tighten the nuts on the bolts. In addition, it is awkward and difficult to attach the nuts to the downward extending bolts.

Another type of adjustable seat for a tricycle is illustrated in U.S. Pat. No. 4,546,991 to Allen et al. The Allen et al. '991 patent shows a tricycle with a vertically-extending hole formed in the middle portion of the main tube. A bracket features a front portion with a number of longitudinally-aligned and vertically-extending holes and a rear portion that supports the tricycle seat. The front portion of the bracket is secured to the main tube via a bolt extending down through one of the bracket holes and the main tube hole. The bracket hole is selected based on the desired position of the seat. A nut is attached to the bottom of the downward-extending bolt. This arrangement also requires the use of tools to adjust the seat. In addition, once again, it is awkward and difficult to attach the nuts to the downward extending bolts.

Accordingly, it is an object of the present invention to provide an adjustable seat for a children's vehicle that may be adjusted without using tools.

It is another object of the present invention to provide an adjustable seat for a children's vehicle that may be easily adjusted.

It is still another object of the present invention to provide an adjustable seat for a children's vehicle that is simple and economical to produce.

These and other objects and advantages will be apparent from the following specification.

SUMMARY OF THE INVENTION

The present invention is an adjustable seat for a children's vehicle, such as a tricycle, that includes a main frame member with a number of wheels attached thereto. A seat support frame member is attached to the main frame member and a plate is secured to the top of the seat support member so that it is oriented in a generally horizontal plane. The plate features a number of ridges and a pair of slots formed therein. A seat features a pair of bolt holes and a bottom surface featuring a number of seat ridges. A pair of bolts pass one each through the bolt holes and the pair of slots and are engaged on their bottom ends by a pair of knobs. The knobs may be turned in a first direction to permit the seat to be moved with respect to the plate and turned in a second direction whereby the seat ridges engage the plate ridges to lock the seat in a selected position.

The following detailed description of embodiments of the invention, taken in conjunction with the appended claims and accompanying drawings, provide a more complete understanding of the nature and scope of the invention.

DESCRIPTION OF THE PREFERRED EMBODIMENT

Figure 1:
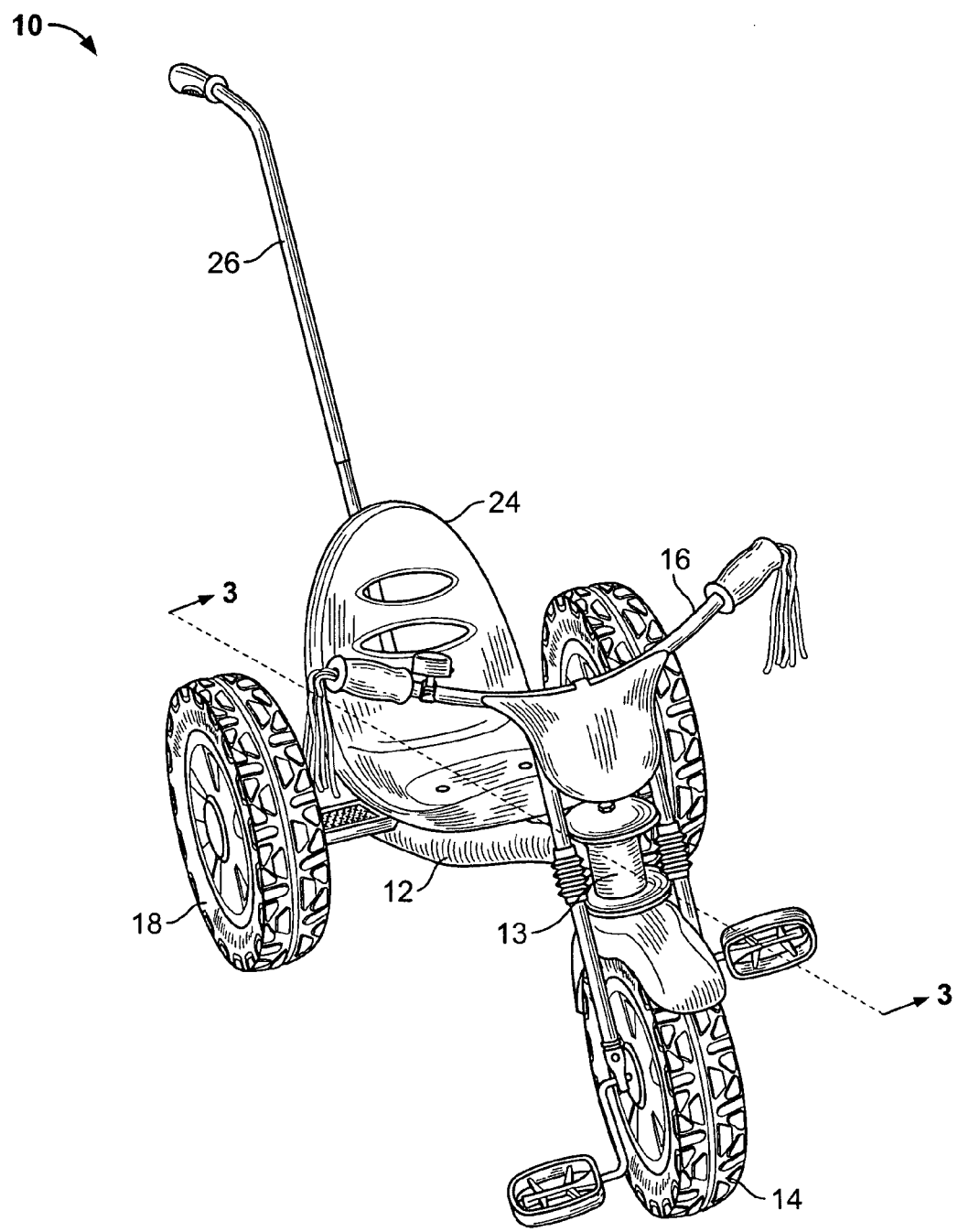
FIG. 1 is a top front perspective view of a tricycle equipped with an embodiment of the adjustable seat of the present invention.
Figure 2:
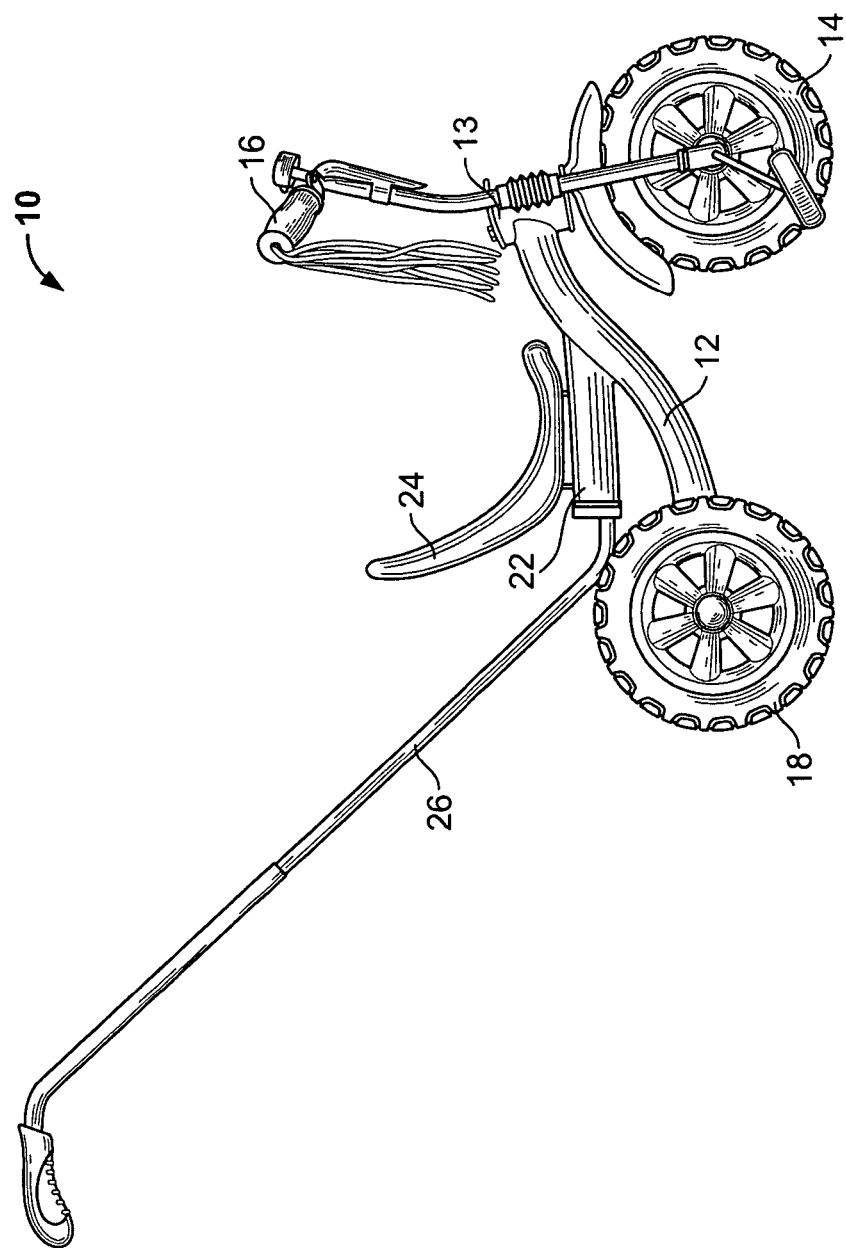
FIG. 2 is a side elevational view of the tricycle of FIG. 1.

The invention is an adjustable seat for a children's vehicle such as the tricycle indicated in general at 10 in FIGS. 1 and 2. While the invention is described below and in the figures in terms of a tricycle, other types of children's vehicles are contemplated by the present invention. These children's vehicles include, but are not limited to, pedal cars, foot to floor toys, ride-ons and go carts.

As illustrated in FIGS. 1 and 2, the tricycle 10 features a main frame member 12 which has a leading end featuring a head tube 13 to which the tricycle front wheel 14 and handlebars 16 are pivotally attached. The rear wheels 18 of the tricycle are attached to the trailing end of the main frame member. A seat support member 22 is attached to the drop tube and extends rearward in a generally horizontal fashion. As will be explained in greater detail, the seat support member 22 supports seat 24. In addition, the seat support member 22 features a hole in its trailing end so that it receives the bottom end of push handle 26 in a removable fashion. The main frame and seat support members 12 and 22 are preferably made from steel tubing, but may be made from any rigid material.

Figure 3:
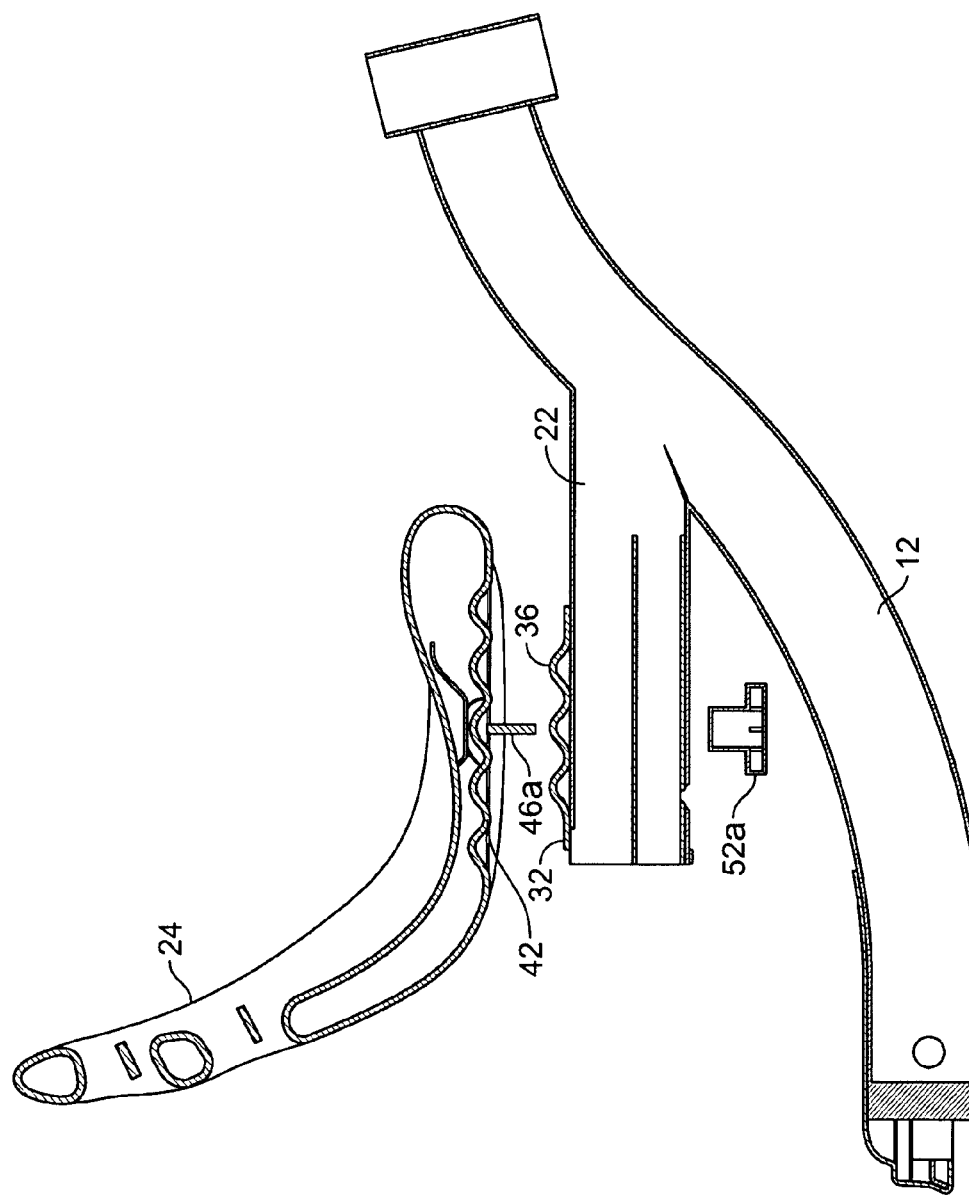
FIG. 3 is an exploded sectional view of the frame members and seat of the tricycle of FIGS. 1 and 2 taken along line A—A of FIG. 1.
Figure 4:
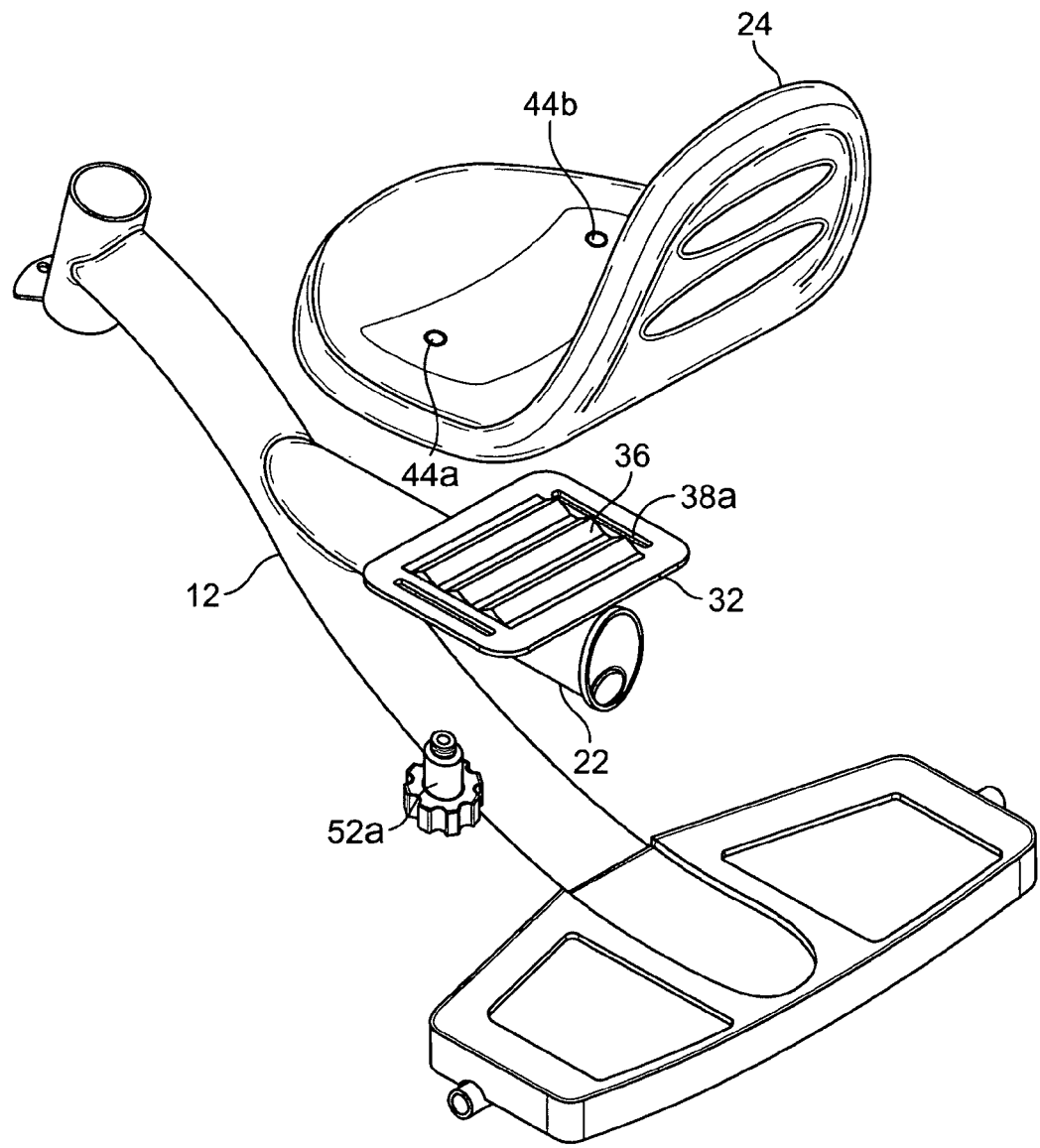
FIG. 4 is an exploded top rear perspective view of the frame members and seat of the tricycle of FIGS. 1–3.
Figure 5:
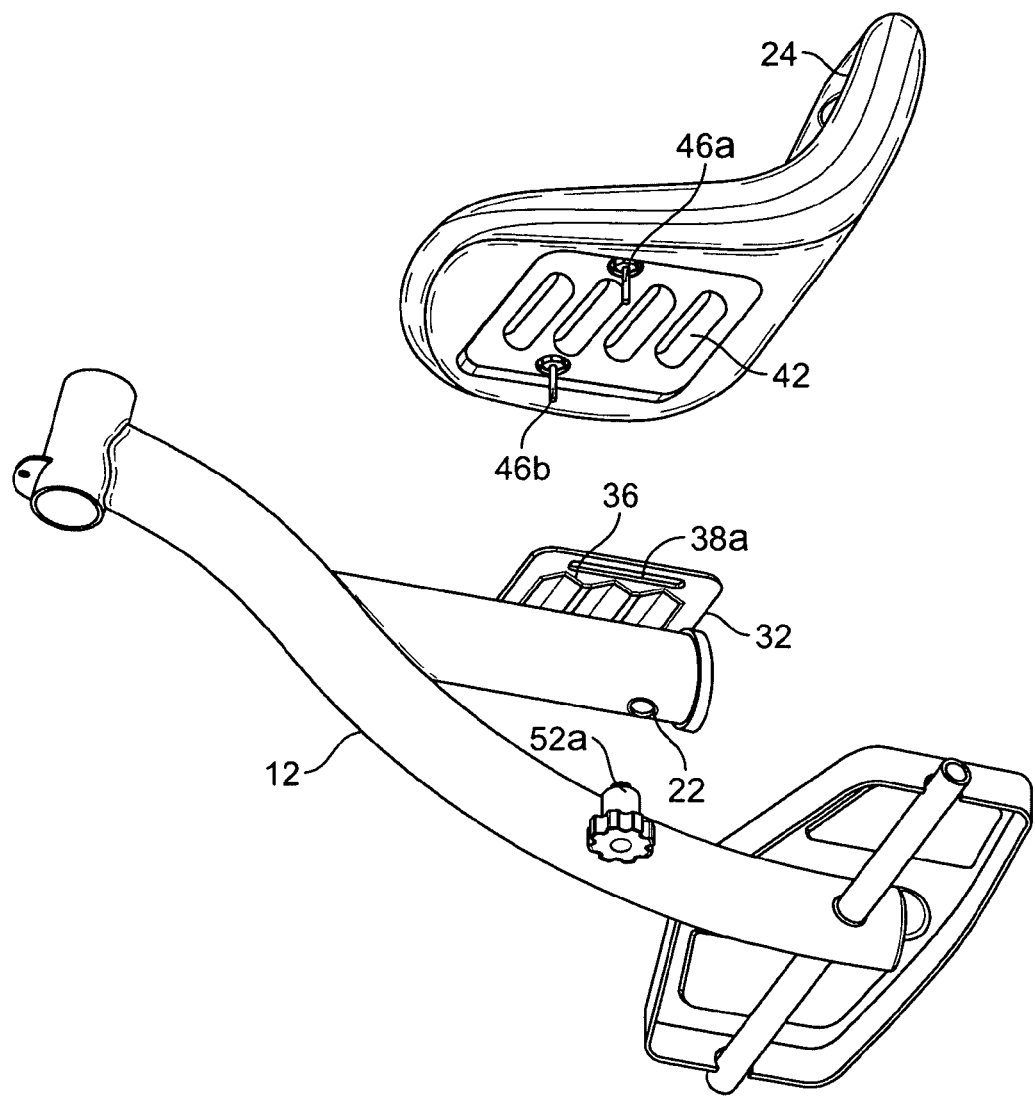
FIG. 5 is an exploded bottom front perspective view of the frame members and seat of the tricycle of FIGS. 1–4.

As illustrated in FIGS. 3–5, a plate 32 is secured to the top of seat support member 22 so that it is oriented in a generally horizontal plane. The plate is preferably attached by welding but may alternatively be attached by bolts or other attachment arrangements known in the art. The plate is preferably constructed of steel but may be constructed of an alternative rigid material. The plate features a central portion that features transverse ridges 36. A pair of slots 38a and 38b are formed in side portions of the plate that are positioned on opposing sides of the plate central portion.

As illustrated in FIGS. 3 and 5, the seat 24 of the tricycle features transverse ridges 42 positioned on its bottom surface. In the preferred embodiment, the seat is molded from plastic and the ridges are molded into the bottom surface. The seat could alternatively could be constructed of metal or another material, or feature a metal frame, with the ridges formed in the bottom surface. The seat could also feature a two-piece construction with the ridges attached to the bottom of the seat as a separate piece. The seat is also equipped with a pair of bolt openings 44a and 44b (FIG. 4) which receive bolts 46a and 46b (FIGS. 3 and 5).

Figure 6:
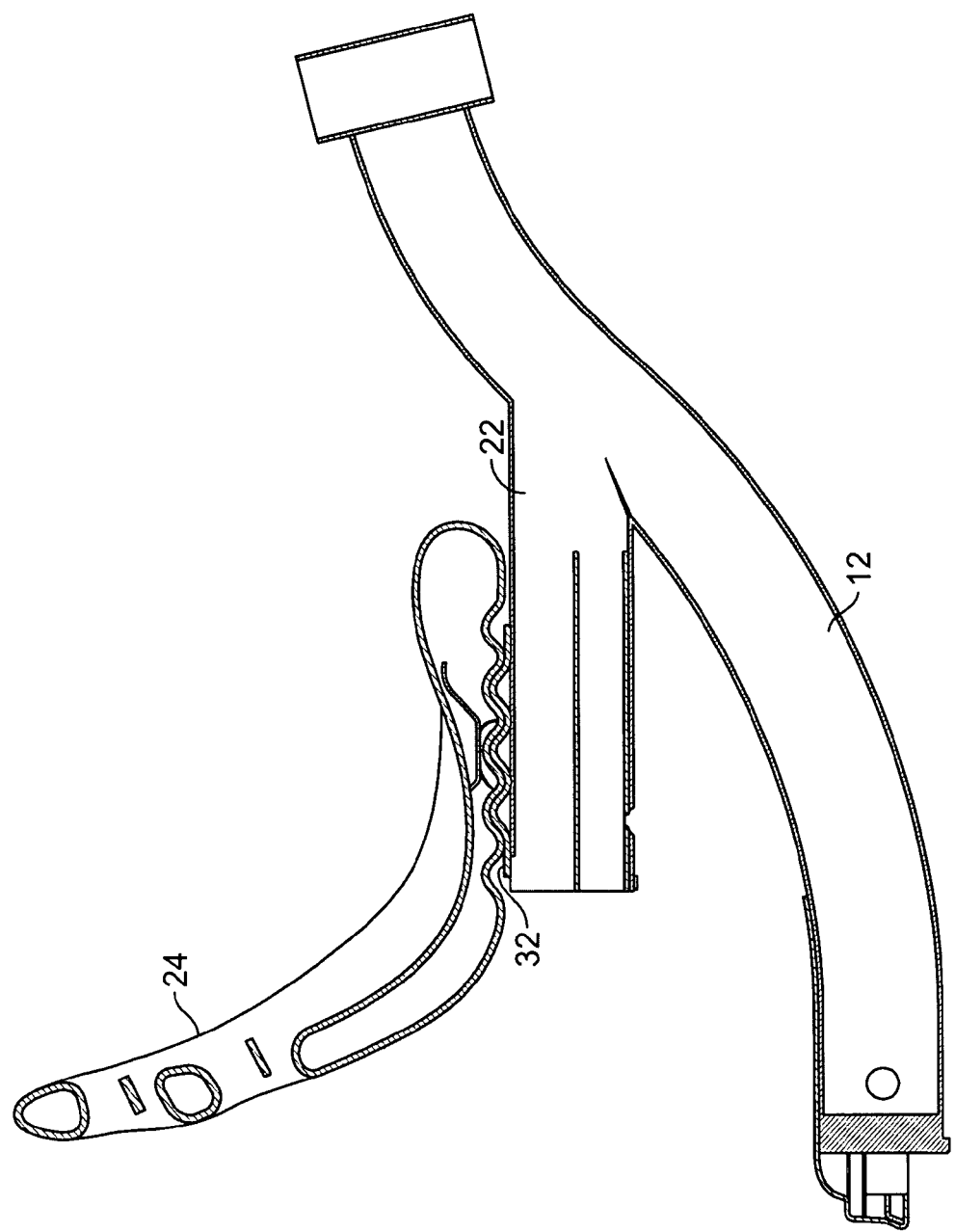
FIG. 6 is a sectional view of the frame members and seat of the tricycle of FIGS. 1 and 2 taken along line A—A of FIG. 1.

As illustrated in FIG. 6, the ridges on the bottom of the seat 24 engage the ridges of the plate 32. With reference to FIG. 5, the bolts 46a and 46b also pass through slots 38a and 38b of the plate. A pair of threaded knobs 52a and 52b attach to the bolts 46a and 46b, respectively, to secure the seat 24 to the plate 32. The engagement of ridges 42 and 36 lock the seat in the selected position. When it is desired to move the seat towards the front or rear of the trike to accommodate a rider having a different size, knobs 52a and 52b are turned so that they are loosened. This permits the seat to be lifted slightly so that ridges 36 and 42 disengage. When this occurs, the seat may be slid either forward or backwards along plate 32 as the bolts 46a and 46b traverse slots 38a and 38b of the plate. When the desired position is obtained, the seat may once again by locked in place by turning knobs 52a and 52b in an opposite direction so that they tighten.

It should be noted that the positions of the slots 38a and 38b and transverse ridges 36 on the plate 32 could be reversed, or alternative positions for the slots and ridges on the plate could be selected, in alternative embodiments of the invention. In addition, the ridges of the plate could run in a direction other than transverse. For example, they could be V-shaped. Of course the configurations of the bolts 46a and 46b and the ridges 42 on the seat 24 would have to be altered to mate with the plate.

While the preferred embodiments of the invention have been shown and described, it will be apparent to those skilled in the art that changes and modifications may be made therein without departing from the spirit of the invention, the scope of which is defined by the appended claims.

What is claimed is:

1. A children's vehicle featuring:
    a) a main frame member with a plurality of wheels attached thereto;
    b) a plate secured to the top of the frame member, said plate featuring a plurality of plate ridges and a first slot formed therein;
    c) a seat featuring a first bolt hole and having a bottom surface featuring a plurality of seat ridges;
    d) a first bolt passing through the first bolt hole of the seat and said first slot of the plate; and
    e) a first knob engaging a bottom portion of said first bolt so that said first knob may be turned in a first direction to permit the seat to be moved with respect to said plate and turned in a second direction whereby the seat ridges engage the plate ridges to lock the seat in a selected position.

2. The children's vehicle of claim 1 wherein the seat ridges and plate ridges feature a transverse orientation.

3. The children's vehicle of claim 1 wherein the children's vehicle is a tricycle.

4. The children's vehicle of claim 1 wherein the main frame member is steel tubing.

5. The children's vehicle of claim 1 further comprising a seat support member extending from the main frame member with the plate mounted thereto.

6. The children's vehicle of claim 5 further comprising a push handle removably attached to the seat support member.

7. The children vehicle of claim 5 wherein the seat support member is constructed from steel tubing.

8. The children's vehicle of claim 1 further comprising a second slot formed in the plate and wherein the plate features a central portion with the plate ridges formed therein and the first and second slots are formed on opposing sides of the central portion.

9. The children's vehicle of claim 8 further comprising a second bolt and a second knob and wherein said seat features a second bolt hole with said second bolt passing through the second bolt hole of the seat and the second slot of the plate with the second knob engaging a bottom portion of the second bolt.

10. The children's vehicle of claim 1 wherein the seat is constructed of plastic with the seat ridges molded on the bottom surface.

11. The children's vehicle of claim 1 wherein the plate is constructed from steel.

12. An adjustable seat for a children's vehicle comprising:
    a) a plate adapted to be secured to the children's vehicle, said plate featuring a plurality of plate ridges and a first slot formed therein;
    b) a seat featuring a first bolt hole and having a bottom surface featuring a plurality of seat ridges;
    c) a first bolt passing through the first bolt hole of the seat and said first slot of the plate; and
    d) a first knob engaging a bottom portion of said first bolt so that said first knob may be turned in a first direction to permit the seat to be moved with respect to said plate and turned in a second direction whereby the seat ridges engage the plate ridges to lock the seat in a selected position.

13. The adjustable seat of claim 12 wherein the seat ridges and plate ridges feature a transverse orientation.

14. The adjustable seat of claim 12 where the plate is constructed from steel.

15. The adjustable seat of claim 12 further comprising a seat support member adapted to extend from children's vehicle and having said plate mounted thereto.

16. The adjustable seat of claim 15 further comprising a push handle removably attached to the seat support member.

17. The adjustable seat of claim 15 wherein the seat support member is constructed from steel tubing.

18. The adjustable seat of claim 12 further comprising a second slot formed in the plate and wherein the plate features a central portion with the plate ridges formed therein and the first and second slots are formed on opposing sides of the central portion.

19. The adjustable seat of claim 18 further comprising a second bolt and a second knob and wherein said seat features a second bolt hole with said second bolt passing through the second bolt hole of the seat and the second slot of the plate with the second knob engaging a bottom portion of the second bolt.

20. The adjustable seat of claim 12 wherein the seat is constructed of plastic with the seat ridges molded on the bottom surface.

* * * * *